US008457022B2

(12) United States Patent
Lindh et al.

(10) Patent No.: US 8,457,022 B2
(45) Date of Patent: Jun. 4, 2013

(54) METHOD AND APPARATUS FOR PROVIDING SIGNALING OF REDUNDANCY VERSIONS

(75) Inventors: Lars Lindh, Helsingfors (FI); Mieszko Chmiel, San Diego, CA (US); Frank Frederiksen, Klarup (DK)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 212 days.

(21) Appl. No.: 12/564,536

(22) Filed: Sep. 22, 2009

(65) Prior Publication Data

US 2010/0080152 A1  Apr. 1, 2010

Related U.S. Application Data

(60) Provisional application No. 61/099,049, filed on Sep. 22, 2008.

(51) Int. Cl.
*H04L 29/02* (2006.01)
*H04L 12/28* (2006.01)

(52) U.S. Cl.
USPC ........................................................ 370/280

(58) Field of Classification Search
USPC .................. 370/276, 277, 280, 310, 312, 431, 370/474
See application file for complete search history.

(56) References Cited

U.S. PATENT DOCUMENTS

| 7,823,040 B2 * | 10/2010 | Cheng ............................. 714/751 |
| 7,881,236 B2 * | 2/2011 | Park et al. ...................... 370/278 |
| 7,925,953 B2 * | 4/2011 | Malkamaki et al. ........... 714/748 |
| 2005/0076283 A1 | 4/2005 | Malkamaki et al. |
| 2005/0250454 A1 * | 11/2005 | Sebire et al. ................ 455/67.11 |
| 2007/0042782 A1 * | 2/2007 | Lee et al. ...................... 455/450 |
| 2008/0090517 A1 * | 4/2008 | Cheng ............................. 455/39 |
| 2009/0028129 A1 * | 1/2009 | Pi et al. ......................... 370/351 |
| 2009/0098876 A1 * | 4/2009 | Khan et al. .................... 455/445 |
| 2009/0100309 A1 * | 4/2009 | Zheng ........................... 714/748 |
| 2009/0125774 A1 * | 5/2009 | Kim et al. ..................... 714/748 |
| 2009/0279460 A1 * | 11/2009 | Sarkar ........................... 370/280 |
| 2009/0300456 A1 * | 12/2009 | Pelletier et al. ............... 714/749 |
| 2009/0327828 A1 * | 12/2009 | Ojala et al. .................... 714/749 |
| 2010/0023830 A1 * | 1/2010 | Wengerter et al. ............ 714/748 |
| 2010/0027460 A1 * | 2/2010 | Kim et al. ..................... 370/315 |

(Continued)

FOREIGN PATENT DOCUMENTS

| CN | 101257372 A | 9/2008 |
| WO | WO 2006/030019 A2 | 3/2006 |
| WO | WO 2007/083555 A1 | 7/2007 |

OTHER PUBLICATIONS

3GPP TR 08.008 V0.0.1, "Technical Report 3rd Generation Partnership Project; Technical Specification Group, Overview of 3GPP Release 8; Summary of all Release 8 Features (Release 8)", Aug. 2008, 187 pages.

(Continued)

*Primary Examiner* — Chi Pham
*Assistant Examiner* — Robert Lopata
(74) *Attorney, Agent, or Firm* — Ditthavong, Mori & Steiner, P.C.

(57) ABSTRACT

An approach is provided for efficient signaling of redundancy version information. A redundancy version signaling module detects the start of a system information radio transmission window and assigns a redundancy version sequence at the start of the transmission window.

13 Claims, 15 Drawing Sheets

U.S. PATENT DOCUMENTS

| | | | | |
|---|---|---|---|---|
| 2010/0034139 | A1* | 2/2010 | Love et al. | 370/328 |
| 2010/0284490 | A1* | 11/2010 | Kim et al. | 375/298 |
| 2010/0309870 | A1* | 12/2010 | Wengerter et al. | 370/329 |
| 2011/0122825 | A1* | 5/2011 | Lee et al. | 370/328 |
| 2011/0246846 | A1* | 10/2011 | Ojala et al. | 714/748 |

OTHER PUBLICATIONS

3GPP TR 23.882 V1.15.0, "3rd Generation Partnership Project; Technical Specification Group Services and System Aspects; 3GPP System Architecture Evolution: Report on Technical Options and Conclusions (Release 7)", Feb. 2008, 262 pages.

3GPP TR 25.813 V7.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", Sep. 2006, 41 pages.

3GPP TR 25.814 V1.5.0, "Physical Layer Aspects for Evolved UTRA (Release 7)", May 2006, 125 pages.

3GPP TS 36.211 V8.3.0, "Evolved Universal Terrestrial Radio Access (E-UTRA); Physical Channels and Modulation (Release 8)", May 2008, 77 pages.

3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", May 2008, 134 pages.

3GPP TS 36.321 V8.2.0, "Evolved Universal Terrestrial Radio Access (E-UTRA) Medium Access Control (MAC) protocol specification (Release 8)", May 2008, 33 pages.

3GPP TS 36.331 V8.2.0, "Evolved Universal Terrestrial Radio Access (E-UTRA), Radio Resource Control (RRC), Protocol specification (Release 8)", May 2008, 151 pages.

3GPP TSG RAN 1 #54, R1-083207, "DCI Format 1C with implicit RV and TBS", Jeju, Korea, Aug. 2008, 5 pages.

3GPP TSG RAN WG 1 #52, R1-081009, "RV Selection for uplink HARQ", Sorrento, Italy, Feb. 2008, 4 pages.

3GPP TSG RAN WG1 Meeting #49bis, R1-073200, "An RV definition scheme with variable starting Positions", LG Electronics, Orlando, USA, Jun. 25-29, 2007, XP050106834, 5 pages.

3GPP TSG-RAN Working Group 1 #52, R1-080945, "Simulation results on RV usage for uplink HARQ", Sorrento, Italy, Feb. 2008, 2 pages.

International Search Report and Written Opinion for the corresponding PCT App. No. PCT/EP2009/062255 dated Mar. 9, 2010, pp. 1-17.

* cited by examiner

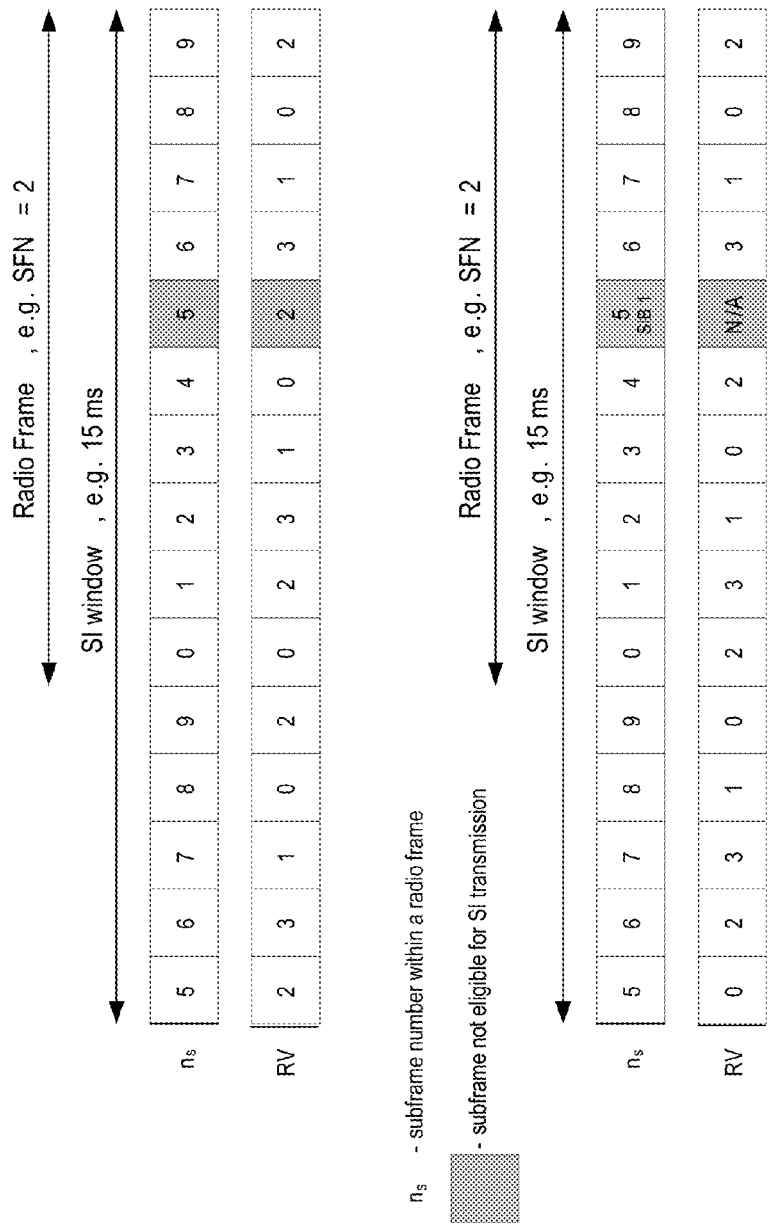

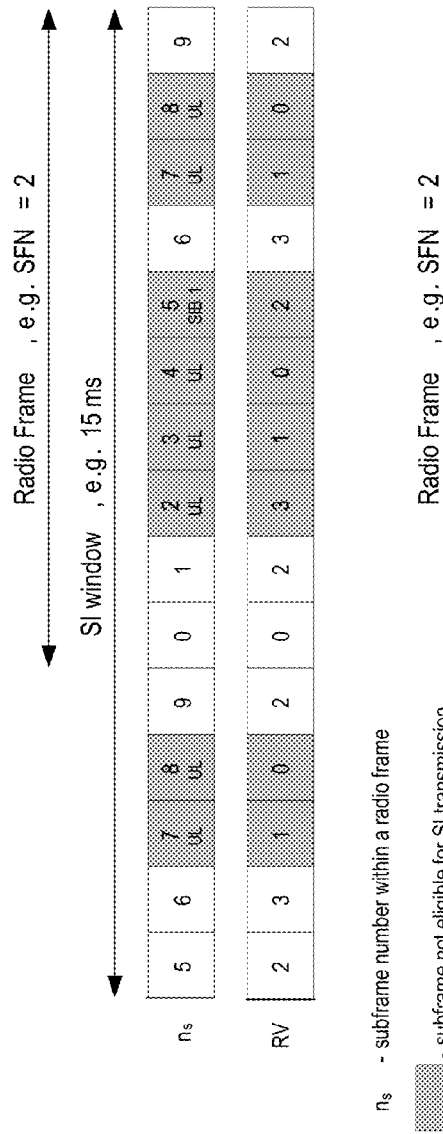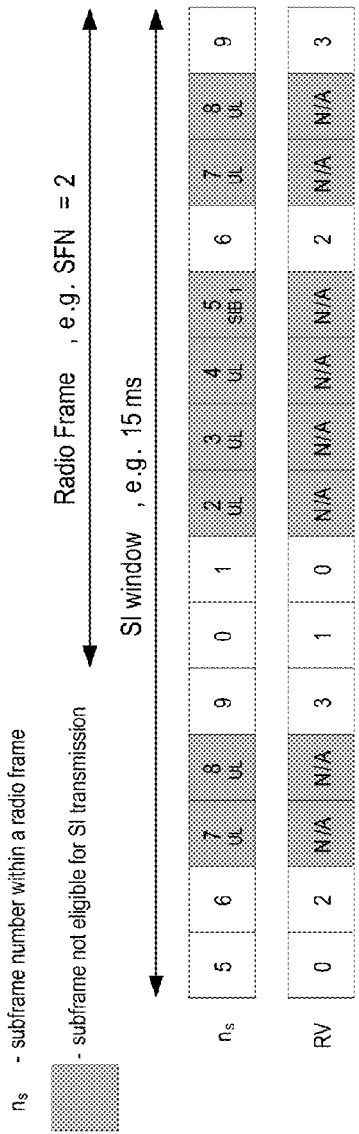
FIG. 8A
FIG. 8B

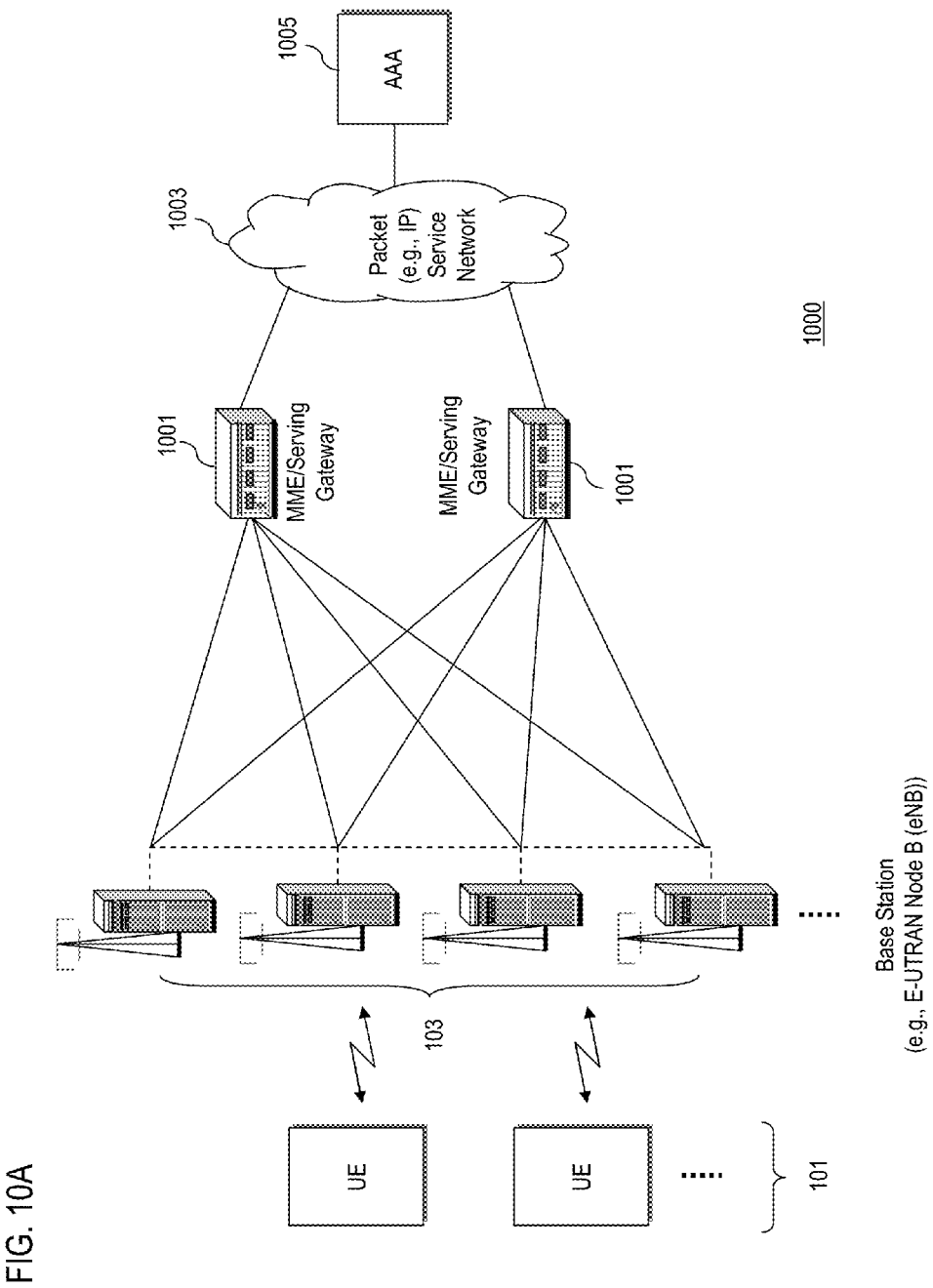

METHOD AND APPARATUS FOR PROVIDING SIGNALING OF REDUNDANCY VERSIONS

RELATED APPLICATIONS

This application claims the benefit of the earlier filing date under 35 U.S.C. §119(e) of U.S. Provisional Application Ser. No. 61/099,049 filed Sep. 22, 2008, entitled "Method and Apparatus for Providing Signaling of Redundancy Versions," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves acknowledgment signaling, whereby transmissions can be implicitly or explicitly acknowledged to convey successful transmission of data. An inefficient acknowledgement scheme can unnecessarily consume network resources.

Therefore, there is a need for an approach for providing efficient signaling, which can co-exist with already developed standards and protocols.

SOME EXAMPLE EMBODIMENTS

According to one embodiment, a method comprises detecting start of a system information message transmission window. The method also comprises assigning a redundancy version sequence at the start of the transmission window.

According to another embodiment, a computer-readable storage medium carrying on or more sequences of one or more instructions which, when executed by one or more processors, cause an apparatus to detect start of a system information message transmission window. The apparatus is also caused to assign a redundancy version sequence at the start of the transmission window.

According to another embodiment, an apparatus comprises a redundancy version signaling module configured to detect start of a system information message transmission window and to assign a redundancy version sequence at the start of the transmission window.

According to another embodiment, an apparatus comprises means for detecting start of a system information message transmission window. The apparatus also comprises means for assigning a redundancy version sequence at the start of the transmission window.

According to another embodiment, a method comprises assigning a redundancy version sequence at a start of the transmission window by allocating the sequence to non-multicast subframes within a system information message transmission window, and by allocating the sequence to remaining subframes within the system information message transmission window.

According to another embodiment, a computer-readable storage medium carrying on or more sequences of one or more instructions which, when executed by one or more processors, cause an apparatus to assign a redundancy version sequence at a start of the transmission window by allocating the sequence to non-multicast subframes within a system information message transmission window, and by allocating the sequence to remaining subframes within the system information message transmission window.

According to another embodiment, an apparatus comprises a redundancy version signaling module configured to assign a redundancy version sequence at a start of the transmission window by allocating the sequence to non-multicast subframes within a system information message transmission window, and by allocating the sequence to remaining subframes within the system information message transmission window.

According to yet another embodiment, an apparatus comprises means for assigning a redundancy version sequence at a start of the transmission window by allocating the sequence to non-multicast subframes within a system information message transmission window, and by allocating the sequence to remaining subframes within the system information message transmission window.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A and 7B are diagrams, respectively, of a conventional redundancy version mapping scheme, and of a redundancy version mapping scheme according to an exemplary embodiment, each scheme pertaining to an exemplary system information message window length of 15 ms for Frequency Division Duplex (FDD);

FIGS. 8A and 8B are diagrams, respectively, of a conventional redundancy version mapping scheme, and of a redundancy version mapping scheme according to an exemplary embodiment, each scheme pertaining to an exemplary system information message window length of 15 ms for Time Division Duplex (TDD);

FIGS. 10A-10D are diagrams of communication systems having exemplary long-term evolution (LTE) architectures, in which the user equipment (UE) and the base station of FIG. 1 can operate, according to various exemplary embodiments of the invention;

DESCRIPTION OF SOME EMBODIMENTS

An apparatus, method, and software for implicitly signaling redundancy version information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
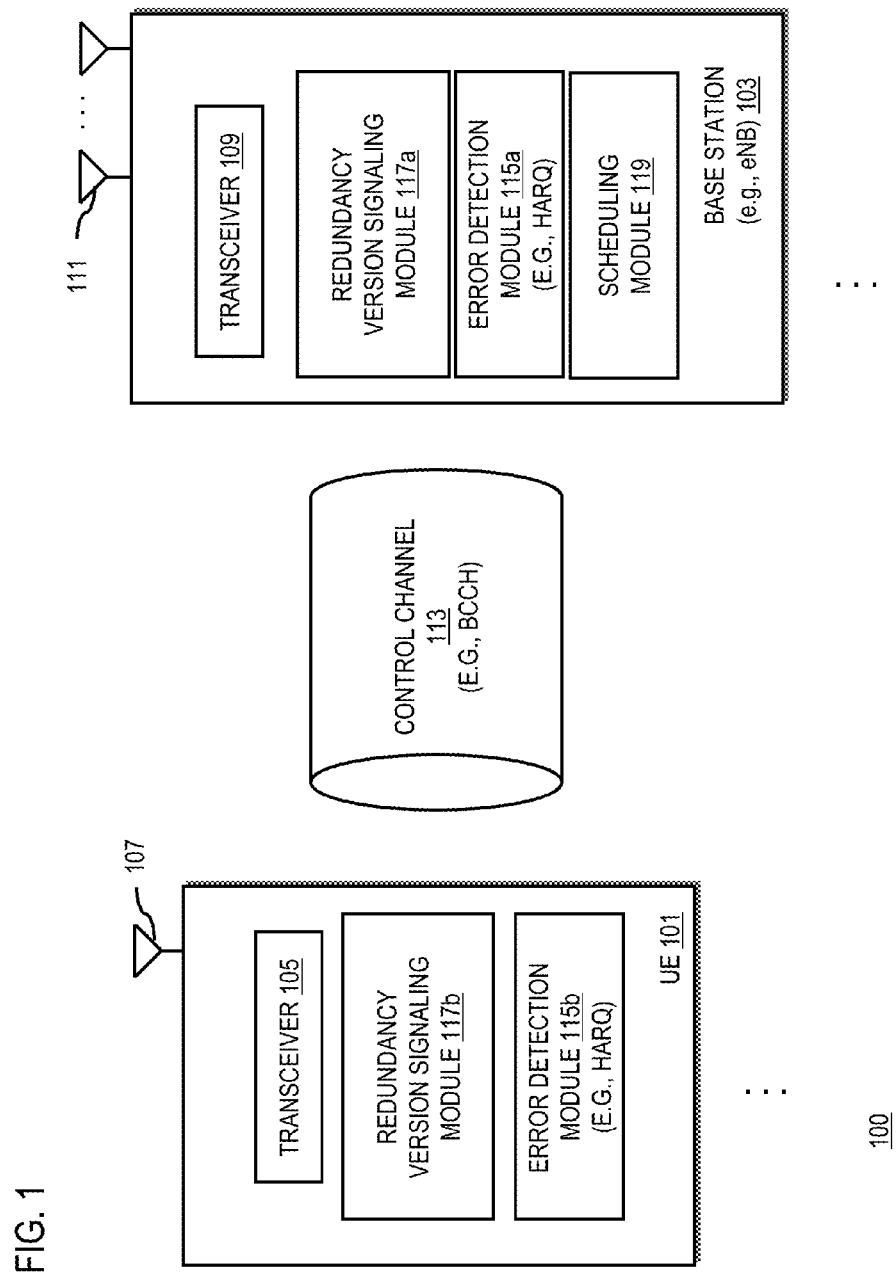
FIG. 1 is a diagram of a communication system capable of providing signaling of redundancy versions, according to an exemplary embodiment.

FIG. 1 is a diagram of a communication system capable of providing signaling of redundancy version, according to an exemplary embodiment. As shown in FIG. 1, a communication system 100 includes one or more user equipment (UEs) 101 communicating with a base station 103, which is part of an access network (e.g., 3GPP LTE or E-UTRAN, etc.) (not shown). Under the 3GPP LTE architecture (as shown in FIGS. 10A-10D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 includes a transceiver 105 and an antenna system 107 that couples to the transceiver 105 to receive or transmit signals to the base station 103. The antenna system 107 can include one or more antennas. For the purposes of illustration, the time division duplex (TDD) mode of 3GPP is described herein; however, it is recognized that other modes can be supported, e.g., frequency division duplex (FDD).

As with the UE 101, the base station 103 employs a transceiver 109, which transmits information to the UE 101. Also, the base station 103 can employ one or more antennas 111 for transmitting and receiving electromagnetic signals. For instance, the Node B 103 may utilize a Multiple Input Multiple Output (MIMO) antenna system, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access)) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

In one embodiment, the system of FIG. 1 provides MBMS (Multimedia Broadcast Multicast Services) services in a MBSFN (Multimedia Broadcast Single Frequency Network). An MBSFN typically has other neighboring MBSFNs or unicast networks operating at the same frequency.

Communications between the UE 101 and the base station 103 (and thus, the network) is governed, in part, by control information exchanged between the two entities. Such control information, in an exemplary embodiment, is transported over a control channel 113 on, for example, the downlink from the base station 103 to the UE 101. By way of example, a number of communication channels are defined for use in the system 100. The channel types include: physical channels, transport channels, and logical channels. For instance in LTE system, the physical channels include, among others, a Physical Downlink Shared channel (PDSCH), Physical Downlink Control Channel (PDCCH), Physical Uplink Shared Channel (PUSCH), and Physical Uplink Control Channel (PUCCH). The transport channels can be defined by how they transfer data over the radio interface and the characteristics of the data. In LTE downlink, the transport channels include, among others, a broadcast channel (BCH), paging channel (PCH), and Down Link Shared Channel (DL-SCH). In LTE uplink, the exemplary transport channels are a Random Access Channel (RACH) and UpLink Shared Channel (UL-SCH). Each transport channel is mapped to one or more physical channels according to its physical characteristics.

Each logical channel can be defined by the type and required Quality of Service (QoS) of information that it carries. In LTE system, the associated logical channels include, for example, a broadcast control channel (BCCH), a paging control channel (PCCH), Dedicated Control Channel (DCCH), Common Control Channel (CCCH), Dedicated Traffic Channel (DTCH), etc.

In LTE system, the BCCH (Broadcast Control Channel) can be mapped onto both BCH and DL-SCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identifier) is used to identify the resource allocation information.

To ensure accurate delivery of information between the eNB 103 and the UE 101, the system 100 utilizes error detection modules 115a and 115b, respectively, in exchanging information, e.g., Hybrid ARQ (HARQ). HARQ is a concatenation of Forward Error Correction (FEC) coding and an Automatic Repeat Request (ARQ) protocol. In one embodiment, the error detection modules 115a-115b work in conjunction with the scheduling module 119 of the eNB 103 to schedule the transmissions of error control signalling. Automatic Repeat Request (ARQ) is an error recovery mechanism used on the link layer. As such, this error recovery scheme is used in conjunction with error detection schemes (e.g., CRC (cyclic redundancy check)), and is handled with the assistance of error detection modules and within the eNB 103 and UE 101, respectively. The HARQ mechanism permits the receiver (e.g., UE 101) to indicate to the transmitter (e.g., eNB 103) that a packet or sub-packet has been received incorrectly, and thus, requests the transmitter to resend the particular packet(s).

The HARQ functionality employs redundancy information (e.g., redundancy version (RV) parameters) to control the transmissions. Accordingly, the eNB 103 and UE 101 possess, in an exemplary embodiment, redundancy version signaling modules 117a and 117b, respectively. For example, the UE 101 can be configured to use the same incremental redundancy version for all transmissions. Accordingly, an RV sequence specifies the RV parameters associated with a block of transmissions.

It should be noted that for the transmission of SI-x information on the PDSCH, HARQ in its normal form is not used, as there is no UL channel for carrying this information. However, the RV properties of HARQ during the transmission of the different sub-parts of the encoded packet can be exploited.

In one embodiment, the eNB 103 transmits to terminals (e.g., UE 101) using common control channels (e.g. the Broadcast Control Channel (BCCH)) with variable redundancy versions (RV), but without the corresponding explicit redundancy version signaling. Determination of the RVs at the UE 101 (and at the eNB 103) for the transmission of the BCCH (carried over the DL-SCH and PDSCH) can be problematic.

It is observed that the transmission of the BCCH over DL-SCH/PDSCH has the following characteristics. First, As used herein, downlink (DL) refers to communication in the direction of the eNB 103 (or network) to the UE 101, while uplink (UL) relates to communication in the direction of the UE 101 to the eNB 103 (or network).

In view of the above, implicit RV signaling has received significant attention. For example, one traditional approach provides that the redundancy version sequence of 0,2,3,1 . . . is optimal among all possible (permutations of) RV sequences; and this offers performance close to the optimal IR performance of so called pure circular buffer.

In another approach, this RV sequence is used for LTE UL non-adaptive, synchronous HARQ retransmissions. However, in such a case, the eNode B knows the exact time instances where it can expect the retransmissions. On the contrary, for BCCH transmissions the eNode B has the flexibility to select the subframes in which retransmissions will take place so the UE 101 does not have the full knowledge about time instances of retransmission.

In another approach, the BCCH's RVs are linked to subframe number ($n_s, n_s=0,1, \ldots, 9$) and/or to radio frame number (SFN, SFN=0,1, . . . , 1023). This is illustrated in Table 1 for SIB1 and SI-x.

TABLE 1

| SIB1 - the RV linked to the radio frame number (SFN) | | | | | | | | | | | | | | | | |
|---|---|---|---|---|---|---|---|---|---|---|---|---|---|---|---|---|
| SFN mod8 | | | | | | | | | | | | | | | | |
| | 0 | 1 | 2 | 3 | 4 | 5 | 6 | 7 | 0 | 1 | 2 | 3 | 4 | 5 | 6 | 7 |
| RV | 0 | N/A | 2 | N/A | 3 | N/A | 1 | N/A | 0 | N/A | 2 | N/A | 3 | N/A | 1 | N/A |
| SI-x (x > 1) - the RV linked to the subframe number ($n_s$) | | | | | | | | | | | | | | | | |
| Subframe number ($n_s$) | | | | | | | | | | | | | | | | |
| | 0 | 1 | 2 | 3 | 4 | 5 | 6 | 7 | 8 | 9 | | | | | | |
| RV | 0 | 2 | 3 | 1 | 0 | 2 | 3 | 1 | 0 | 2 | | | | | | | multiple system information blocks can be carried on the BCCH, each with its own transmission time interval (TTI), denoted as $T_x$ (e.g., System Information Block Type 1 (SIB1) has the TTI of 80 ms, for SI-2 the TTI can be 160 ms, etc. for SI-x, x=2, . . . , 8).

Second, SI-x transmission can have multiple instances within a TTI; and those multiple transmissions can be soft-combined at the UE 101 within a window. The window size is configurable; and the same for all SI-x within one cell, it is one of w $\in \{1,2,5,10,15,20,40\}$ ms (see 3GPP TS 36.331 v8.2.0, "Evolved Universal Terrestrial Radio Access (E-UTRA); Radio Resource Control (RRC); Protocol specification"; which is incorporated herein by reference in its entirety). The exact position and the number of SI-x transmission instances within the window w is eNB 103 implementation-specific.

Third, multiple SI-x transmission instances can have different redundancy versions in order to obtain incremental redundancy (IR) gains during the above mentioned soft combining approach at the UE 101.

Fourth, the BCCH transmission over the PDSCH is scheduled with a special downlink (DL) control channel (PDCCH) referred to as Downlink Control Information (DCI) format 1C, which compared to other DCI formats does not, for example, contain the 2 explicit bits for RV signaling in order to reduce the overhead and increase coverage.

The first approach cannot be reused directly for the BCCH RV determination because the time instances for BCCH retransmissions are not fully specified (i.e., the eNB has the full flexibility to select the number and positions of SI-x transmissions within the respective window). In the second approach, for SI-x's RV selection, it is observed that it is not guaranteed that each SI-x window position will be aligned with the start of subframe numbering ($n_s$ or $n_s$ mod 4). In these cases the RV sequence may be suboptimal if the eNB 103 decides to schedule the SI-x transmission instances consecutively within the corresponding window. Moreover, for certain window sizes (e.g., 20 ms and 40 ms), and also for certain window positions, the probability of occurrence of each RV is not equal. Additionally, this approach does not take into account possible UL subframes (in case of TDD carriers) and possible MBSFN subframes, which might further escalate the above problems of unequal probabilities of RV occurrence and suboptimal RV sequences.

The above traditional approaches for implicit signaling are further described in the following (all of which are incorporated herein by reference in their entireties): R1-080945, "Simulation results on RV usage for uplink HARQ", Nokia Siemens Networks, Nokia; R1-081009, "RV selection for uplink HARQ", LG Electronics; 3GPP TS 36.321v8.2.0, "Evolved Universal Terrestrial Radio Access (E-UTRA); Medium Access Control (MAC) protocol specification";

R1-083207, "DCI Format 1C with implicit RV and TBS", Motorola; and 3GPP TS 36.211 v8.3.0, "Evolved Universal Terrestrial Radio Access (E-UTRA); Physical channels and modulation."

To mitigate the above problems and drawbacks, processes for implicit redundancy version assignment are proposed, as detailed in FIGS. 2-5.

Figure 2:
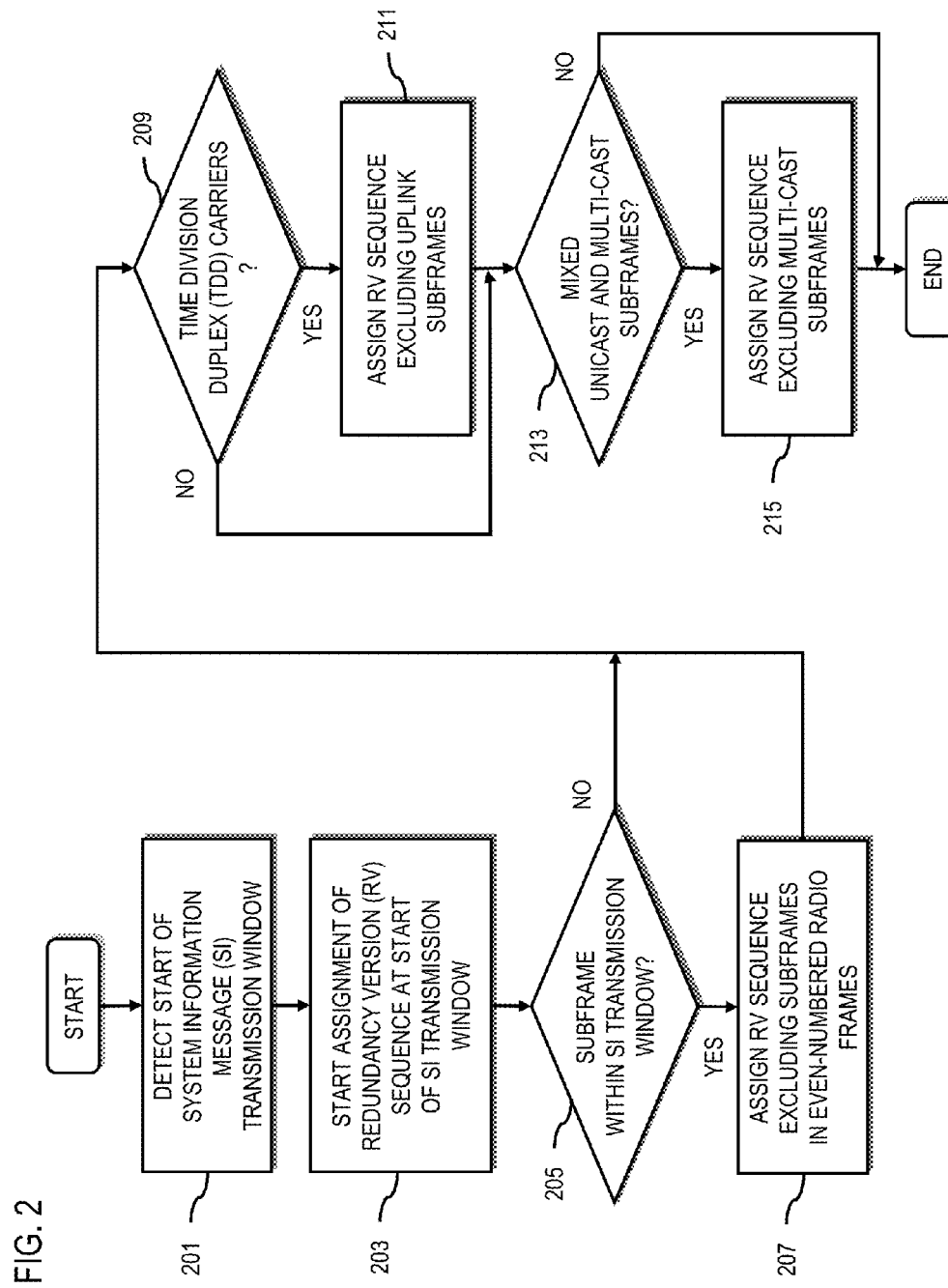
FIGS. 2-5 are flowcharts of processes for signaling of redundancy versions, according to various exemplary embodiments.

FIGS. 2-5 are flowcharts of processes for signaling of redundancy versions, according to various exemplary embodiments. In one embodiment, the processes of FIGS. 2-5 are performed by the RV signaling module 117. As shown in FIG. 2 (denoted as Method 1), the RV signaling module 117 detects the start of system information (SI) transmission window (step 201). Next, the assignment of the RV sequence of 02310231 . . . can be started at the beginning of a corresponding SI transmission window (step 203); this method can be further optimized by one or a combination of the enhancements. For example, the process assigns the RV sequence excluding subframes #5 in even-numbered radio frames (when SFN mod 2=0) if such a subframe(s) fall within the SI window (subframes #5 in even-numbered radio frames cannot be used for SI-x, x>1 transmission as they are reserved for SIB1 transmission) (steps 205 and 207). Also, the process assigns the RV sequence excluding UL subframes in case of TDD carriers (UL subframes cannot be used for SI transmission) (steps 209 and 211). This can be considered for all SI-x transmissions as the UL/DL configurations are conveyed by means of SIB1. Although particular subframes are described (e.g., subframe #5), it is contemplated that any predetermined subframe can be utilized.

Further, the process can assign the RV sequence excluding MBSFN (e.g., multi-cast subframes) subframes in case of mixed unicast/MBSFN sub-frames (steps 213 and 215). For instance, this can be considered only for SI-x, where x>2 as the unicast/MBSFN subframe allocations is conveyed by means of SI-2.

Figure 3:
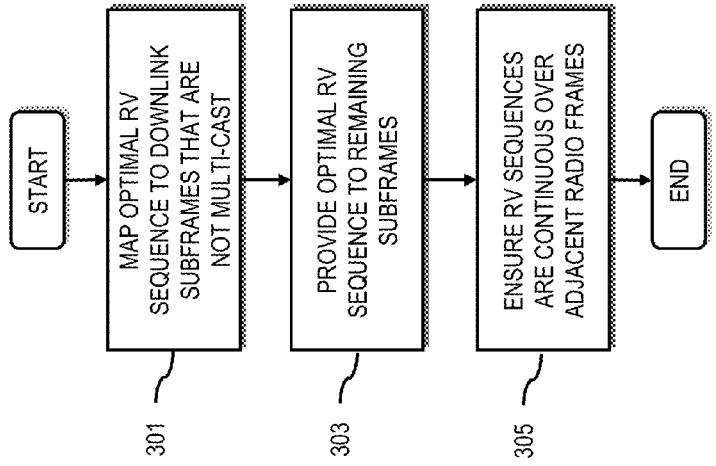

FIG. 3 shows another process (Method 2) for implicit signaling of redundancy version information. For example, in one embodiment, FDD subframes #0, 4, 5 and 9 cannot be used for MBSFN. One starting point for the implicit mapping of the redundancy versions is then to have mapping of the subframe number to the RV, which ensures that the transmission works well also in the case of maximal or optimal MBSFN usage—i.e., all subframes except 0, 4, 5 and 9 are used for MBSFN (step 301). In TDD, the subframes that are not MBSFN can be different (e.g., 0, 1, 5, 6). However, the principle would be the same: first map the optimal RV sequence to DL subframes that are never MBSFN, and then map the optimal RV sequence to the remaining subframes (step 303). Additionally, the RV signaling module 117 can ensure that the RV sequences are mapped so that the sequences are continuous over adjacent radio frames (step 305).

Figure 4:
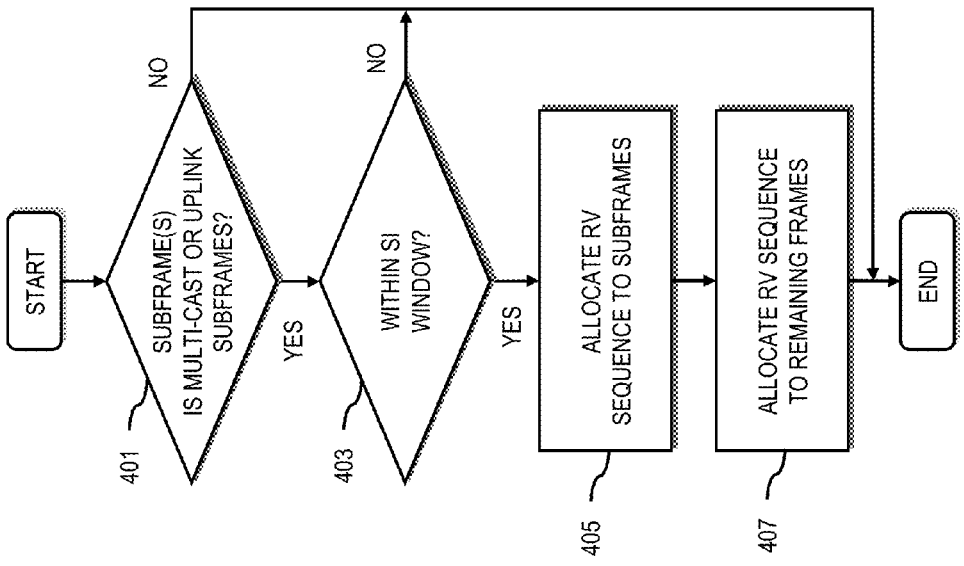

A third approach (Method 3), as shown in the process of FIG. 4, process combines the above Methods 1 and 2, according to an exemplary embodiment. Specifically, the process assigns the optimal RV sequence of 02310231 . . . to subframes in an SI transmission window in the following way. The process of FIG. 4 allocates the RV sequence to the subframes that are guaranteed not to be MBSFN/UL subframes within the SI window by first determining whether the subframes are multi-cast or uplink subframes (step 401) and then whether the subframes are within the SI windows (step 403). If both conditions are met, the RV signaling module 117 allocations the RV sequence to the subframes (step 405). Next, the process allocates the RV sequence to the remaining (e.g., non-UL—i.e. DL) subframes within the SI window (step 407).

Figure 5:
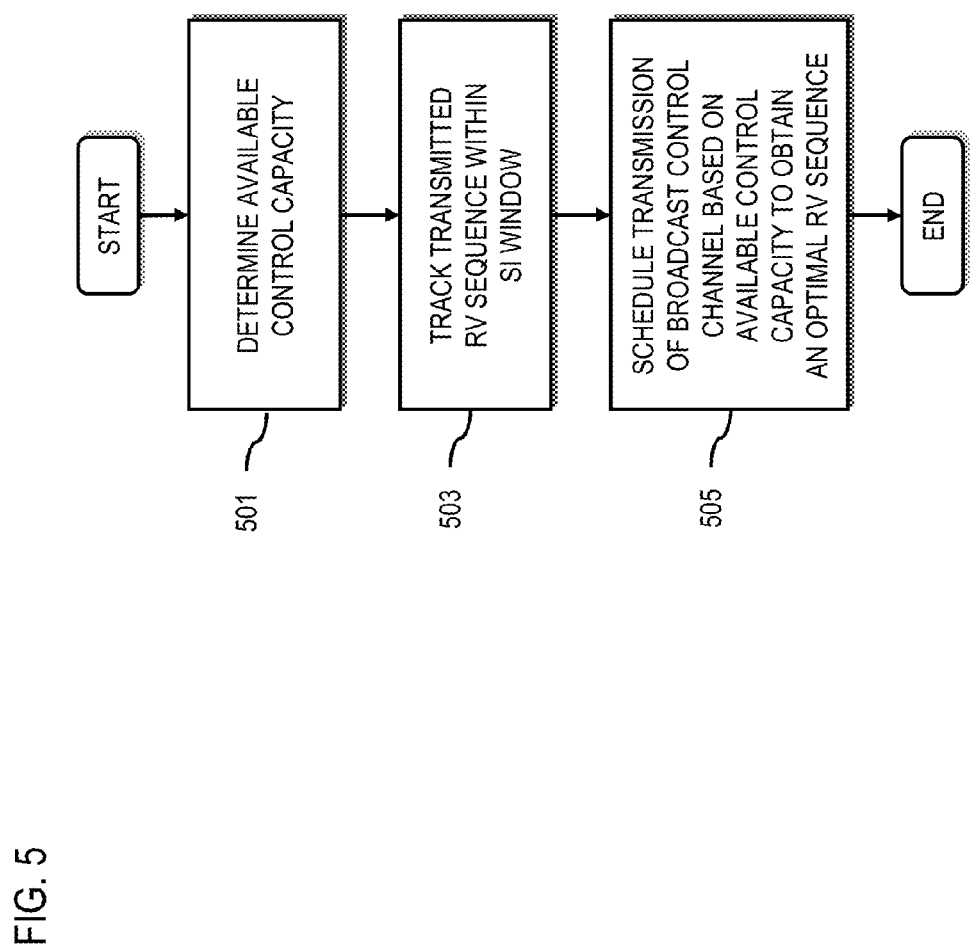

FIG. 5 shows an optional procedure involving the scheduling module 119 of FIG. 1, according to an exemplary embodiment. In one embodiment, the eNB 103 provides a scheduling functionality (via scheduling module 119), which will keep track of the already transmitted BCCH redundancy versions within the SI window. In step 501, the scheduling module 119 determines available control capacity. For example, determining available control capacity includes determining the number and types of control channels 113 that are available to the scheduling module 119. The module 119 then tracks the RV sequences that have been transmitted within the SI window (step 503). Based on the available control capacity and/or the tracked RV sequences, the scheduling module 119 can schedule transmission of a BCCH to obtain an optimal RV sequence (step 505). For instance, the scheduling module 119 can elect to postpone (or advance) the transmission of a BCCH for a few subframes to get the optimum RV sequence.

It is contemplated that the steps of the described processes of FIGS. 2-5 may be performed in any suitable order or combined in any suitable manner.

For the purposes of illustration, the above Method 1 is explained with respect to an exemplary RV mapping (which is contrasted to conventional approaches).

Figure 6A:
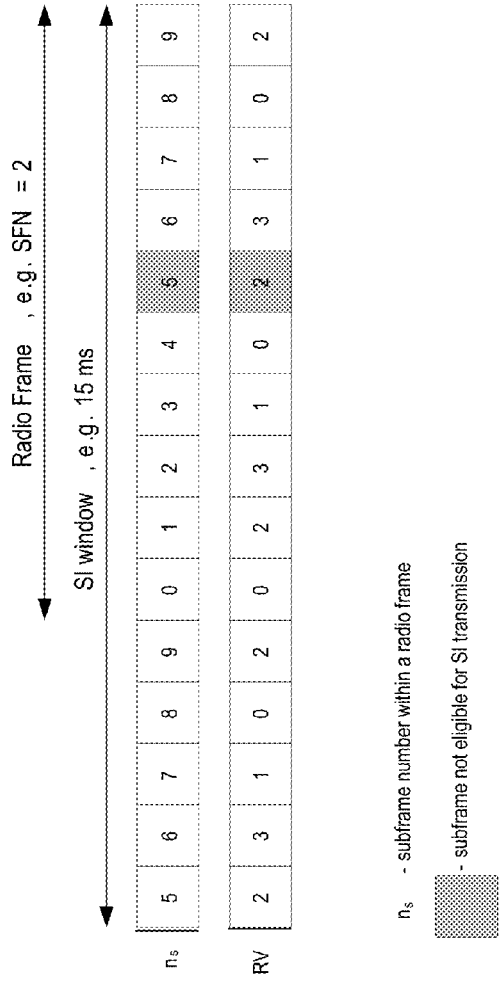
FIGS. 6A and 6B are diagrams, respectively, of a conventional redundancy version mapping scheme, and of a redundancy version mapping scheme according to an exemplary embodiment, each scheme pertaining to an exemplary system information message window length of 15 ms.
Figure 6B:
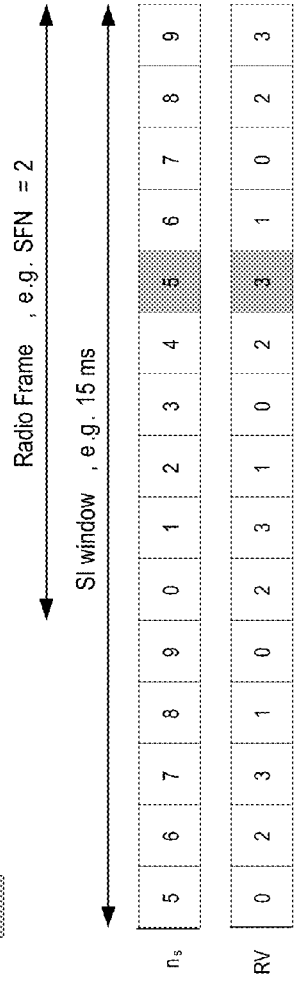

FIGS. 6A and 6B are diagrams, respectively, of a conventional redundancy version mapping scheme, and of a redundancy version mapping scheme according to an exemplary embodiment, each scheme pertaining to an information message window length of, e.g., 15 ms.

As shown, the number of subframes within the SI window is denoted $n_s^w$, the RV for a possible BCCH transmission in subframe i, i=0,1, . . . , $n_s^w$–1 within the window is given by:

$$RV_k = \left\lceil \frac{3}{2}k \right\rceil \bmod 4,$$

where $k = i \bmod 4,$ $i = 0, 1, \ldots , n_s^w - 1.$

In further optimizations the RV sequences are assigned in the same way with the exception that the number of subframes within the window $n_s^{w'}$ does not include subframes #5 in even-numbered radio frames (i.e., when SFNmod2=0) and/or UL subframes within the window so i=0,1, . . . , $n_s^{w'}$–1 and consequently an RV only exists for subframes other than #5 (in even-numbered radio frames) and/or for non-UL subframes, this is illustrated in FIGS. 7A and 7B for FDD and in FIGS. 8A and 8B for TDD.

Regarding Method 2 (FIG. 3), the process for the mapping of RV values to subframes can then be formulated as follows. The RV values are mapped in optimal order to the subframes that are guaranteed to be non-MBSFN: RVs 0,2,3,1->(are mapped to subframes #) 0,4,5,9. Also, the process provides optimal RV sequences in remaining subframes. Further, the optimal RV sequences are made continuous over adjacent radio frames. The process results in an RV to subframe mapping, as shown in Table 2.

TABLE 2

| Subframe # ($n_s$) | RV |
|---|---|
| 0 | 0 |
| 1 | 2 |
| 2 | 3 |
| 3 | 1 |
| 4 | 2 |
| 5 | 3 |
| 6 | 0 |
| 7 | 2 |
| 8 | 3 |
| 9 | 1 |

As for Method 3 (FIG. 4), the number of DL subframes that are guaranteed to be non-MBSFN subframes (assuming a maximum MBSFN allocation) within the SI window is denoted as $n_s^{non-MBSFN,non-UL}$, where the RV for a possible BCCH transmission in subframe i (DL subframe that is guaranteed to be non-MBSFN), i=0,1, ..., $n_s^{non-MBSFN,non-UL}-1$ within the window is given by:

$$RV_k = \left\lceil \frac{3}{2}k \right\rceil \mod 4,$$

where $$k = i \mod 4,$$

$$i = 0, 1, \ldots, n_s^{non-MBSFN,non-UL} - 1.$$

The number of remaining DL subframes (not assigned an RV in the previous step) within the window is denoted as $n_s^{remain}$; the RV for a possible BCCH transmission in these subframes in the SI window is given by:

$$RV_k = \left\lceil \frac{3}{2}k \right\rceil \mod 4,$$

where $$k = i \mod 4,$$

$$i = 0, 1, \ldots, n_s^{remain} - 1.$$

As mentioned, the described processes may be implemented in any number of radio networks.

The approaches of FIGS. 6B, 7B, and 8B provide, according to certain embodiments, a number of advantages over the approaches of FIGS. 6A, 7A, and 7B. Under Method 1, the optimal RV sequence is ensured at the beginning of an SI window. This is especially important in case of consecutive BCCH scheduling and/or in case of multiple retransmissions within short SI windows; the optimal RVs will either reduce the Signal-to-Noise (SNR) required to correctly receive the BCCH or enable quicker BCCH acquisition and UE 101 battery saving. Also, probabilities of occurrence of different RVs within a window are equalized; this is especially important for sparse BCCH scheduling. Further, the order (0231 . . . ) of the optimal RVS is not disturbed. Method 1 also allows two types of implementation: on-the-fly RV calculation according to the above equations or via a stored look-up table linking the subframe numbers within a window with the RVs; it is contemplated that other embodiments are possible.

According to certain embodiments, the process of FIG. 3 (Method 2) likewise provides a number of advantages. The approach advantageously can provide a very simple mapping from the subframe number to the RV, which is independent of the system frame number (SFN). Such an approach can also enable two strategies for sending the system information: minimum time (consecutive) and time diversity (sparse). In the exemplary case in which subframe #5 (in even radio frames) is reserved for SIB1 and cannot be used for other information blocks, Method 2 can compensate for by having a transmit opportunity for RV=3 three times in each system frame.

Moreover, certain embodiments of Method 3 can provide the following advantages. The optimal RVS is ensured at the beginning of an SI window. In addition, the RVS is ensured to support the maximum MBSFN allocation.

The processes for implicit signaling of redundancy information can be performed over a variety of networks; two exemplary systems are described with respect to FIGS. 9 and 10.

Figure 9A:
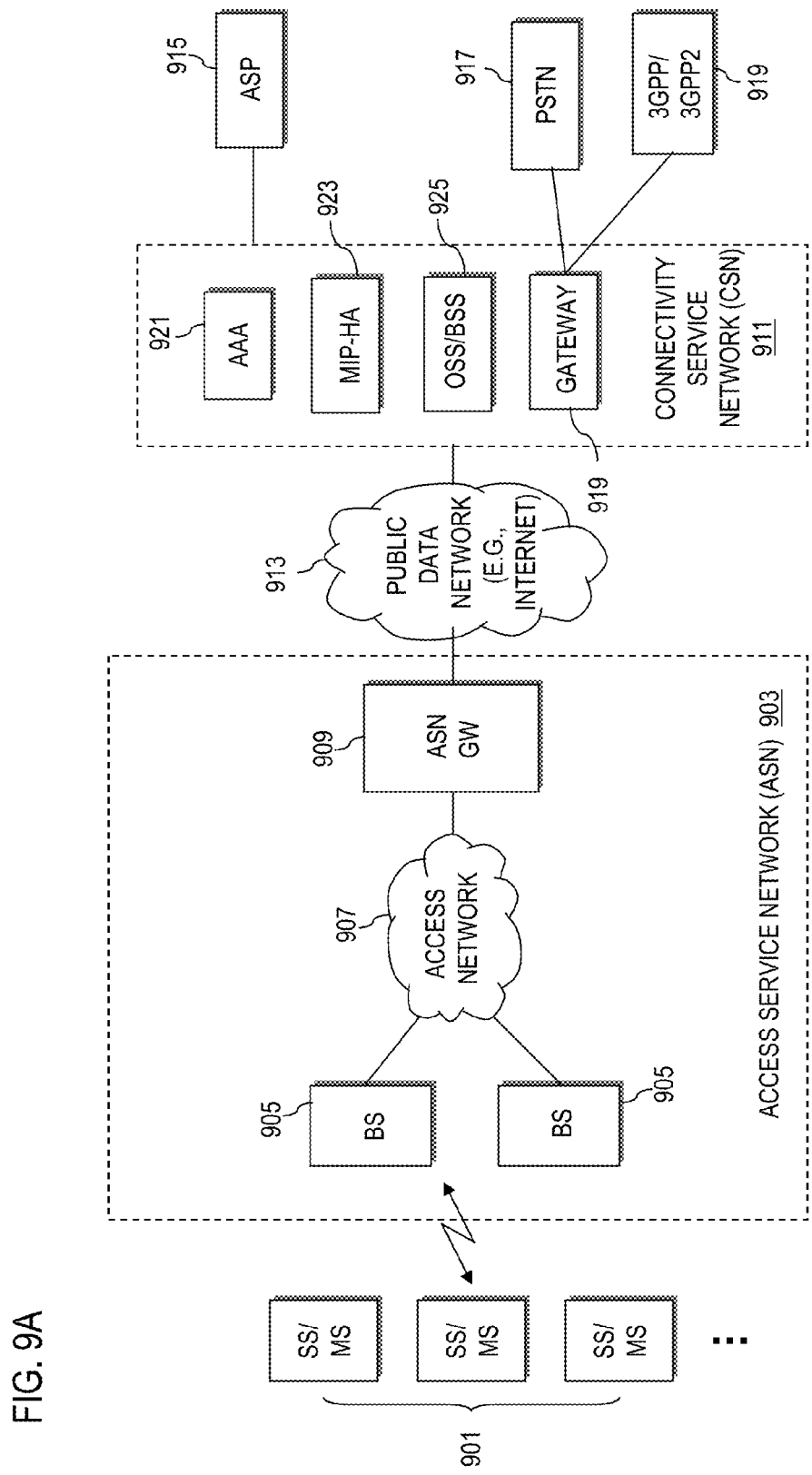
FIGS. 9A and 9B are diagrams of an exemplary WiMAX (Worldwide Interoperability for Microwave Access) architecture, in which the system of FIG. 1 can operate, according to various exemplary embodiments of the invention.
Figure 9B:
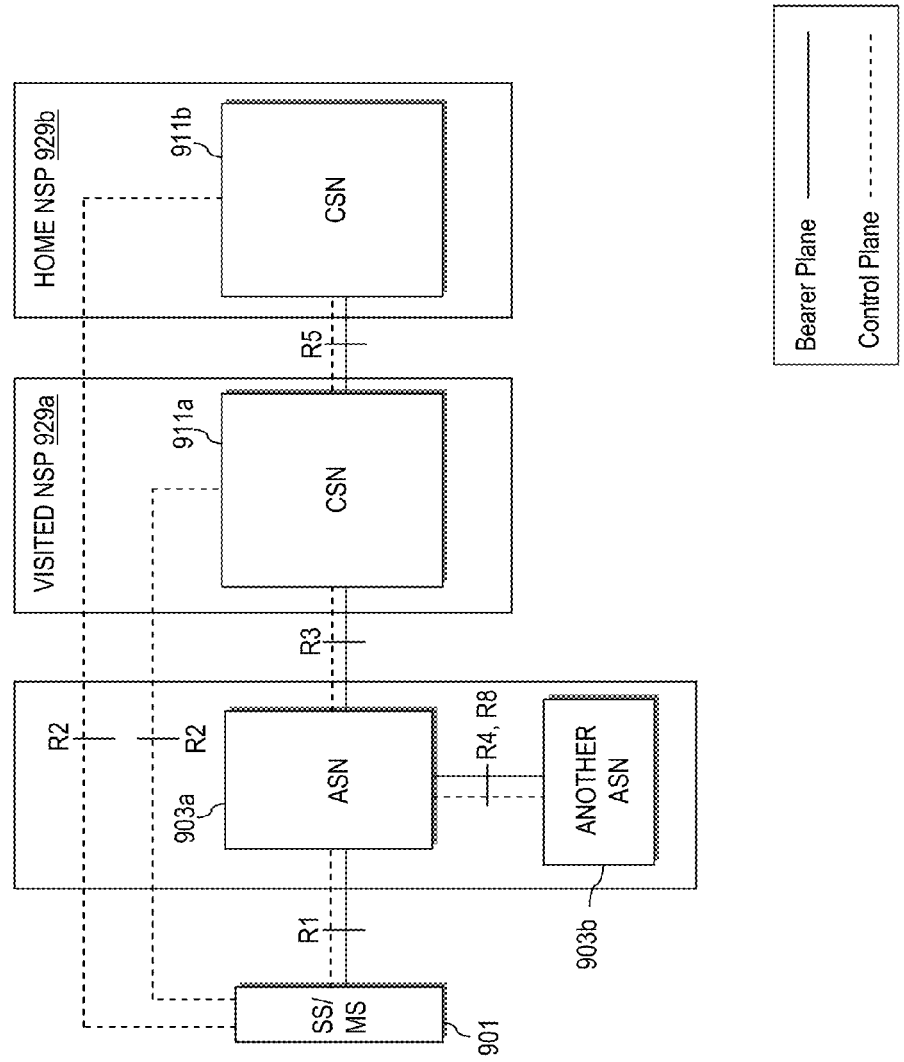

FIGS. 9A and 9B are diagrams of an exemplary WiMAX architecture, in which the system of FIG. 1, according to various exemplary embodiments of the invention. The architecture shown in FIGS. 9A and 9B can support fixed, nomadic, and mobile deployments and be based on an Internet Protocol (IP) service model. Subscriber or mobile stations 901 can communicate with an access service network (ASN) 903, which includes one or more base stations (BS) 905. In this exemplary system, the BS 905, in addition to providing the air interface to the mobile stations 901, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 905 has connectivity to an access network 907. The access network 907 utilizes an ASN gateway 909 to access a connectivity service network (CSN) 911 over, for example, a data network 913. By way of example, the network 913 can be a public data network, such as the global Internet.

The ASN gateway 909 provides a Layer 2 traffic aggregation point within the ASN 903. The ASN gateway 909 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 911.

The CSN 911 interfaces with various systems, such as application service provider (ASP) 915, a public switched telephone network (PSTN) 917, and a Third Generation Partnership Project (3GPP)/3GPP2 system 919, and enterprise networks (not shown).

The CSN 911 can include the following components: Access, Authorization and Accounting system (AAA) 921, a mobile IP-Home Agent (MIP-HA) 923, an operation support system (OSS)/business support system (BSS) 925, and a gateway 927. The AAA system 921, which can be implemented as one or more servers, provide support authentication for the devices, users, and specific services. The CSN 911 also provides per user policy management of QoS and security, as well as IP address management, support for roaming between different network service providers (NSPs), location management among ASNs.

FIG. 9B shows a reference architecture that defines interfaces (i.e., reference points) between functional entities capable of supporting various embodiments of the invention. The WiMAX network reference model defines reference points: R1, R2, R3, R4, and R5. R1 is defined between the SS/MS 901 and the ASN 903a; this interface, in addition to the air interface, includes protocols in the management plane. R2 is provided between the SS/MS 901 and a CSN (e.g., CSN 911a and 911b) for authentication, service authorization, IP configuration, and mobility management. The ASN 903a and CSN 911a communicate over R3, which supports policy enforcement and mobility management.

R4 is defined between ASNs 903a and 903b to support inter-ASN mobility. R5 is defined to support roaming across multiple NSPs (e.g., visited NSP 929a and home NSP 929b).

As mentioned, other wireless systems can be utilized, such as 3GPP LTE, as next explained.

FIGS. 10A-10D are diagrams of communication systems having exemplary long-term evolution (LTE) architectures, in which the user equipment (UE) and the base station of FIG. 1 can operate, according to various exemplary embodiments of the invention. By way of example (shown in FIG. 10A), a base station (e.g., destination node) and a user equipment (UE) (e.g., source node) can communicate in system 1000 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The communication system 1000 is compliant with 3GPP LTE, entitled "Long Term Evolution of the 3GPP Radio Technology" (which is incorporated herein by reference in its entirety). As shown in FIG. 10A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 1001 are connected to the eNBs 103 in a full or partial mesh configuration using tunneling over a packet transport network (e.g., Internet Protocol (IP) network) 1003. Exemplary functions of the MME/Serving GW 1001 include distribution of paging messages to the eNBs 103, termination of U-plane packets for paging reasons, and switching of U-plane for support of UE mobility. Since the GWs 1001 serve as a gateway to external networks, e.g., the Internet or private networks 1003, the GWs 1001 include an Access, Authorization and Accounting system (AAA) 1005 to securely determine the identity and privileges of a user and to track each user's activities. Namely, the MME Serving Gateway 1001 is the key control-node for the LTE access-network and is responsible for idle mode UE tracking and paging procedure including retransmissions. Also, the MME 1001 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 10B:
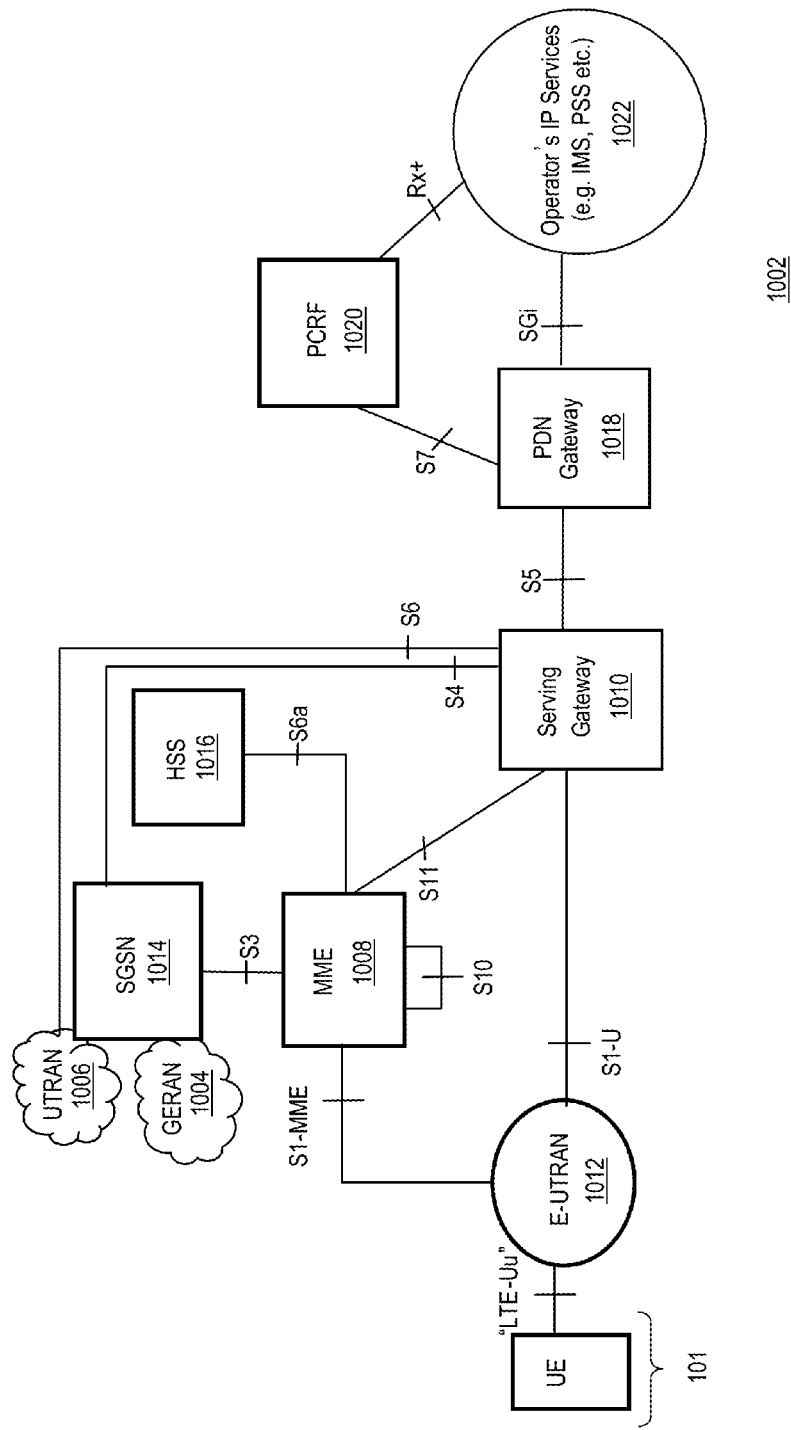

In FIG. 10B, a communication system 1002 supports GERAN (GSM/EDGE radio access) 1004, and UTRAN 1006 based access networks, E-UTRAN 1012 and non-3GPP (not shown) based access networks, and is more fully described in TR 23.882, which is incorporated herein by reference in its entirety. A key feature of this system is the separation of the network entity that performs control-plane functionality (MME 1008) from the network entity that performs bearer-plane functionality (Serving Gateway 1010) with a well defined open interface between them S11. Since E-UTRAN 1012 provides higher bandwidths to enable new services as well as to improve existing ones, separation of MME 1008 from Serving Gateway 1010 implies that Serving Gateway 1010 can be based on a platform optimized for signaling transactions. This scheme enables selection of more cost-effective platforms for, as well as independent scaling of, each of these two elements. Service providers can also select optimized topological locations of Serving Gateways 1010 within the network independent of the locations of MMEs 1008 in order to reduce optimized bandwidth latencies and avoid concentrated points of failure.

As seen in FIG. 10B, the E-UTRAN (e.g., eNB) 1012 interfaces with UE 101 via LTE-Uu. The E-UTRAN 1012 supports LTE air interface and includes functions for radio resource control (RRC) functionality corresponding to the control plane MME 1008. The E-UTRAN 1012 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1008, as a key control node, is responsible for managing mobility UE identifies and security parameters and paging procedure including retransmissions. The MME 1008 is involved in the bearer activation/deactivation process and is also responsible for choosing Serving Gateway 1010 for the UE 101. MME 1008 functions include Non Access Stratum (NAS) signaling and related security. MME 1008 checks the authorization of the UE 101 to camp on the service provider's Public Land Mobile Network (PLMN) and enforces UE 101 roaming restrictions. The MME 1008 also provides the control plane function for mobility between LTE and 2G/3G access networks with the S3 interface terminating at the MME 1008 from the SGSN (Serving GPRS Support Node) 1014.

The SGSN 1014 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1008 and HSS (Home Subscriber Server) 1016. The S10 interface between MMEs 1008 provides MME relocation and MME 1008 to MME 1008 information transfer. The Serving Gateway 1010 is the node that terminates the interface towards the E-UTRAN 1012 via S1-U.

The S1-U interface provides a per bearer user plane tunneling between the E-UTRAN 1012 and Serving Gateway 1010. It contains support for path switching during handover between eNBs 103. The S4 interface provides the user plane with related control and mobility support between SGSN 1014 and the 3GPP Anchor function of Serving Gateway 1010.

The S12 is an interface between UTRAN 1006 and Serving Gateway 1010. Packet Data Network (PDN) Gateway 1018 provides connectivity to the UE 101 to external packet data networks by being the point of exit and entry of traffic for the UE 101. The PDN Gateway 1018 performs policy enforcement, packet filtering for each user, charging support, lawful interception and packet screening. Another role of the PDN Gateway 1018 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 1020 to Policy and Charging Enforcement Function (PCEF) in the PDN Gateway 1018. The SGi interface is the interface between the PDN Gateway and the operator's IP services including packet data network 1022. Packet data network 1022 may be an operator external public or private packet data network or an intra operator packet data network, e.g., for provision of IMS (IP Multimedia Subsystem) services. Rx+ is the interface between the PCRF and the packet data network 1022.

Figure 10C:
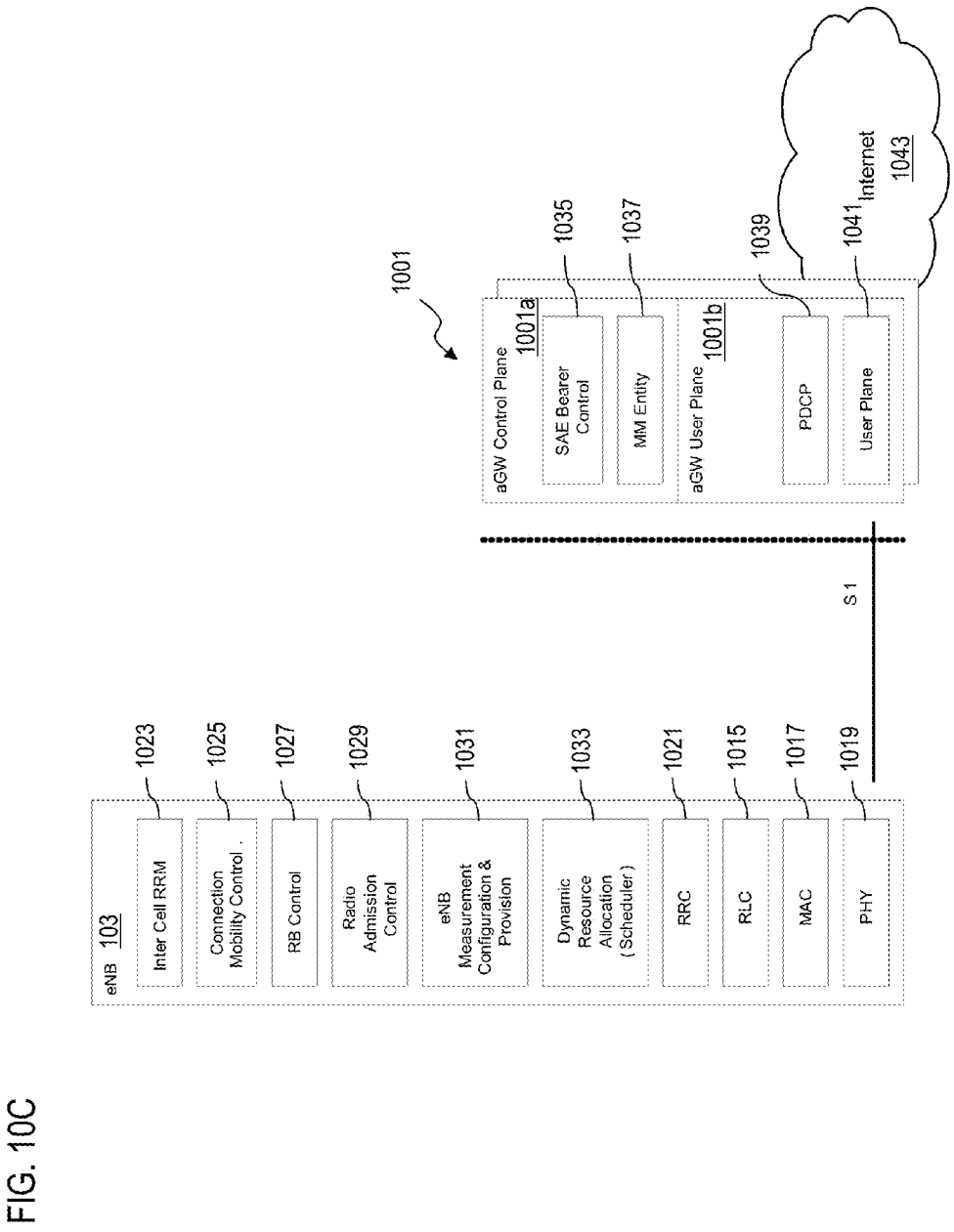

As seen in FIG. 10C, the eNB 103 utilizes an E-UTRA (Evolved Universal Terrestrial Radio Access) (user plane, e.g., RLC (Radio Link Control) 1015, MAC (Media Access Control) 1017, and PHY (Physical) 1019, as well as a control plane (e.g., RRC 1021)). The eNB 103 also includes the following functions: Inter Cell RRM (Radio Resource Management) 1023, Connection Mobility Control 1025, RB (Radio Bearer) Control 1027, Radio Admission Control 1029, eNB Measurement Configuration and Provision 1031, and Dynamic Resource Allocation (Scheduler) 1033.

The eNB 103 communicates with the aGW 1001 (Access Gateway) via an S1 interface. The aGW 1001 includes a User Plane 1001a and a Control plane 1001b. The control plane 1001b provides the following components: SAE (System Architecture Evolution) Bearer Control 1035 and MM (Mobile Management) Entity 1037. The user plane 1001b includes a PDCP (Packet Data Convergence Protocol) 1039 and a user plane functions 1041. It is noted that the functionality of the aGW 1001 can also be provided by a combination of a serving gateway (SGW) and a packet data network (PDN) GW. The aGW 1001 can also interface with a packet network, such as the Internet 1043.

Figure 10D:
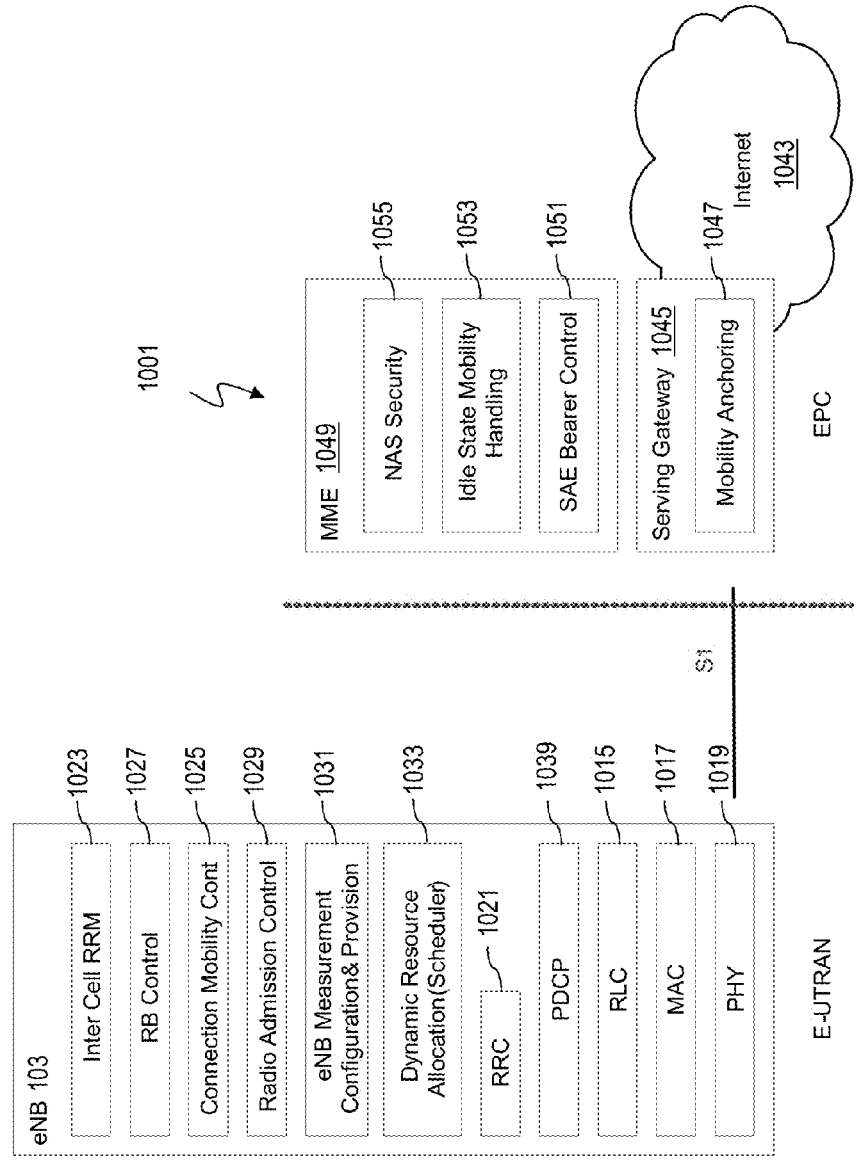

In an alternative embodiment, as shown in FIG. 10D, the PDCP (Packet Data Convergence Protocol) functionality can reside in the eNB 103 rather than the GW 1001. Other than this PDCP capability, the eNB functions of FIG. 10C are also provided in this architecture.

In the system of FIG. 10D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 1045, which includes a Mobility Anchoring function 1047. According to this architecture, the MME (Mobility Management Entity) 1049 provides SAE (System Architecture Evolution) Bearer Control 1051, Idle State Mobility Handling 1053, and NAS (Non-Access Stratum) Security 1055.

One of ordinary skill in the art would recognize that the processes for implicitly signaling redundancy version information (or parameter) may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 11:
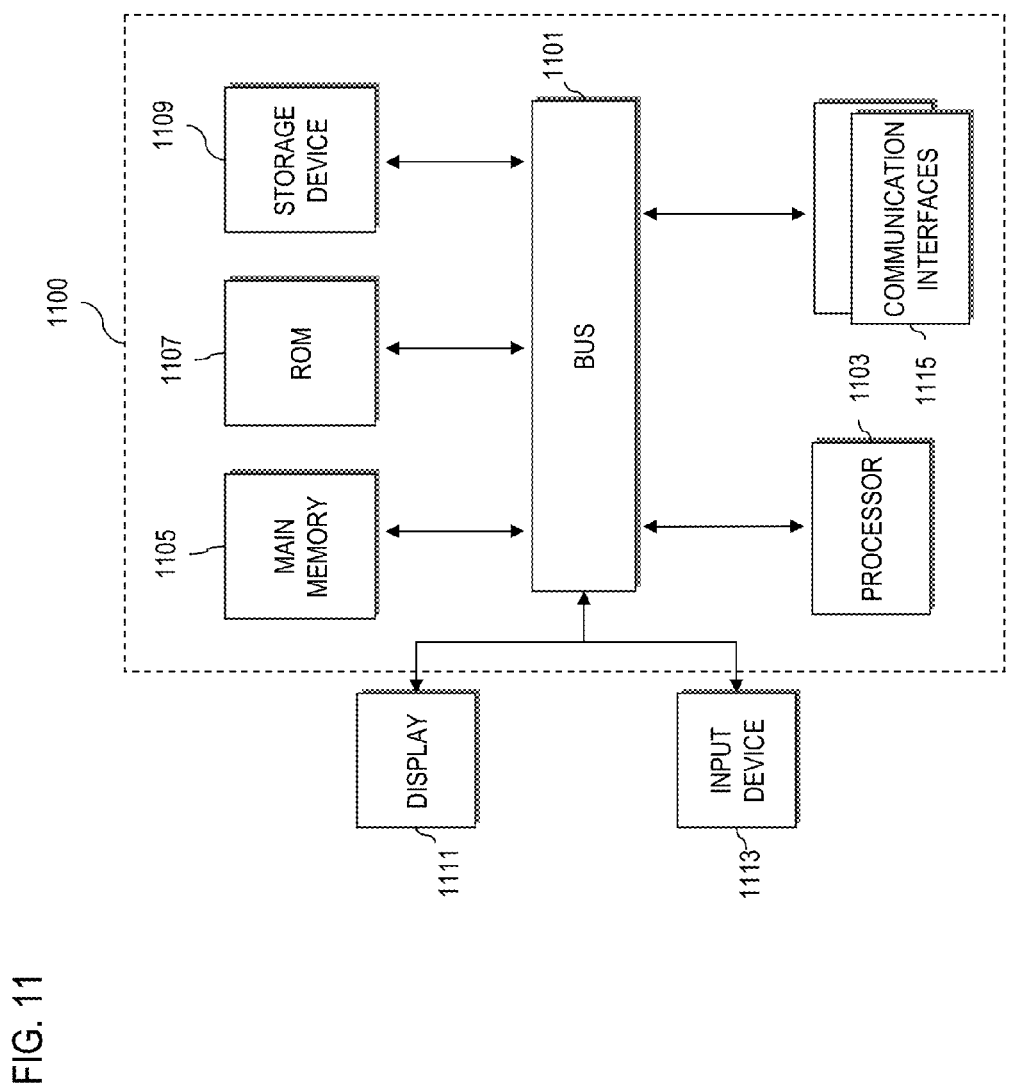
FIG. 11 is a diagram of hardware that can be used to implement an embodiment of the invention.

FIG. 11 illustrates exemplary hardware upon which various embodiments of the invention can be implemented. A computing system 1100 includes a bus 1101 or other communication mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communication interface 1115 coupled to bus 1101. The communication interface 1115 provides a two-way data communication coupling to a network link (not shown). The communication interface 1115 sends and receives electrical, electromagnetic, or optical signals that carry digital data streams representing various types of information. Further, the communication interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
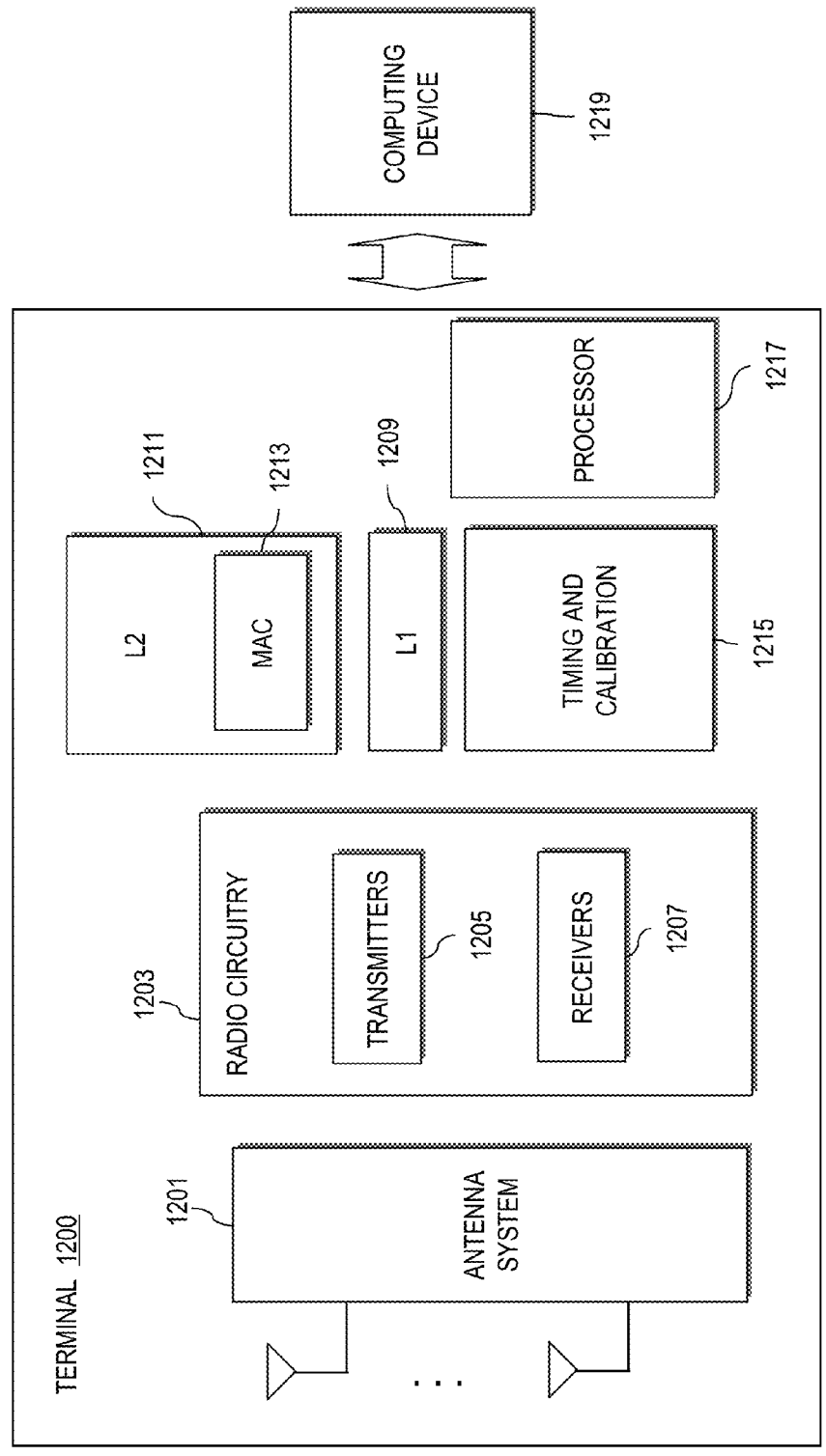
FIG. 12 is a diagram of exemplary components of a user terminal configured to operate in the systems of FIGS. 9 and 10, according to an embodiment of the invention.

FIG. 12 is a diagram of exemplary components of a user terminal configured to operate in the systems of FIGS. 5 and 6, according to an embodiment of the invention. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). L2 unit 1211 can include module 1213, which executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the claims. Although features of the invention are expressed in certain combinations among the claims, it is contemplated that these features can be arranged in any combination and order.

What is claimed is:

1. A method comprising:
    detecting start of a system information message transmission window; and
    assigning a redundancy version sequence at the start of the transmission window,
    wherein the assignment includes excluding one or more of the predetermined subframes in even-numbered radio frames if the subframes are within the transmission window, and
        wherein the assignment includes excluding uplink subframes and multi-cast subframes, and
    wherein the assignment ensures the redundancy version sequence is continuous over adjacent radio frames, and wherein the redundancy version sequence is calculated according to $$RV_k = \left\lceil \frac{3}{2}k \right\rceil \bmod 4,$$

where $RV_k$ is the redundanc version sequence, k=i mod 4, i=0,1, . . . ,$n_s^w$−1, and $n_s^w$ denotes a number of subframes within the system information message transmission window.

2. The method of claim 1, further comprising:
    determining whether the subframes are a mixture of multi-cast subframes and unicast subframes.

3. The method of claim 1, further comprising:
    determining available control capacity;
    tracking the redundancy version sequence with a system information message transmission window; and
    scheduling transmission of a broadcast control channel signal based on the available control capacity to obtain an optimal redundancy version sequence.

4. The method of claim 3, wherein the optimal redundancy version sequence is obtained at the start of the system information message transmission window, and the optimal redundancy version sequence either reduces a-signal-to-noise ratio, enables quicker acquisition of the broadcast control channel signal, reduces power consumption, or a combination thereof.

5. The method of claim 1, wherein the subframes are a part of radio frames that utilize either time division duplex (TDD) carriers or frequency division duplex (FDD) carriers.

6. An apparatus comprising:
    a redundancy version signaling module configured to detect start of a system information message transmission window and to assign a redundancy version sequence at the start of the transmission window, wherein the assignment includes excluding one or more of the predetermined subframes in even-numbered radio frames if the subframes are within the transmission window, and wherein the assignment includes excluding uplink subframes and multi-cast subframes,
    wherein the assignment ensures the redundancy version sequence is continuous over adjacent radio frames, and wherein the redundancy version sequence is calculated according to $$RV_k = \left\lceil \frac{3}{2}k \right\rceil \bmod 4,$$

where $RV_k$ is the redundanc version sequence k=i mod 4, i=0,1, . . . , i=0,1, . . . , $n_s^w$−1, and $n_s^w$ denotes a number of subframes within the system information message transmission window.

7. The apparatus of claim 6, wherein the redundancy version signaling module is further configured to:

determine whether the subframes are a mixture of multicast subframes and unicast subframes.

8. The apparatus of claim 6, wherein the redundancy version signaling module is further configured to:
   determine available control capacity;
   track transmitted redundancy version sequence with a system information message transmission window; and
   schedule transmission of a broadcast control channel signal based on the available control capacity to obtain an optimal redundancy version sequence.

9. The apparatus of claim 8, wherein the optimal redundancy version sequence is obtained at the start of the system information message transmission window, and the optimal redundancy version sequence either reduces a-signal-to-noise ratio, enables quicker acquisition of the broadcast control channel signal, reduces power consumption, or a combination thereof.

10. The apparatus of claim 6, wherein the subframes are a part of radio frames that utilize either time division duplex (TDD) carriers or frequency division duplex (FDD) carriers.

11. A non-transitory computer-readable storage medium carrying one or more sequences of one or more instructions which, when executed by one or more processors, cause an apparatus to perform:
   detecting start of a system information message transmission window; and
   assigning a redundancy version sequence at the start of the transmission window,
   wherein the assignment includes excluding one or more predetermined subframes in even-numbered radio frames if the subframes are within the transmission window and excluding uplink subframes, and wherein the redundancy version sequence is calculated according to $$RV_k = \left\lceil \frac{3}{2}k \right\rceil \bmod 4,$$

where $RV_k$ is the redundancy version sequence, $k = i \bmod 4$, $i = 0, 1, \ldots, n_s^w - 1$, and $n_s^w$ denotes a number of subframes within the system information message transmission window.

12. The non-transitory computer-readable storage medium of claim 11, wherein the apparatus is caused to further perform:
   determining whether the subframes are a mixture of multicast subframes and unicast subframes, wherein the assignment includes excluding the multi-cast subframes.

13. The non-transitory computer-readable storage medium of claim 11, wherein the apparatus is caused to further perform:
   determining available control capacity;
   tracking the redundancy version sequence with a system information message transmission window; and
   scheduling transmission of a broadcast control channel signal based on the available control capacity to obtain an optimal redundancy version sequence.

\* \* \* \* \*